United States Patent [19]
Link

[11] 3,755,714
[45] Aug. 28, 1973

[54] SELF-CONTAINED INTERRUPTING APPARATUS FOR AN ELECTRIC POWER DISTRIBUTION SYSTEM

[75] Inventor: Edwin A. Link, Waukesha, Wis.

[73] Assignee: RTE Corporation, Waukesha, Wis.

[22] Filed: Dec. 20, 1971

[21] Appl. No.: 209,852

Related U.S. Application Data

[63] Continuation-in-part of Ser. No. 23,734, March 30, 1970, abandoned.

[52] U.S. Cl. ............................. 317/29 R, 174/37
[51] Int. Cl. ............................. H02h 3/38
[58] Field of Search .................... 317/29 R; 335/26; 174/37, 38

[56] References Cited
UNITED STATES PATENTS

| | | | |
|---|---|---|---|
| 1,760,521 | 5/1930 | Petch et al. ......................... | 317/29 |
| 2,439,165 | 4/1948 | Graves ............................... | 317/29 |
| 3,376,525 | 4/1968 | Date .................................. | 335/26 |
| 3,526,860 | 9/1970 | Date .................................. | 335/26 |
| 3,488,563 | 1/1970 | Caruthers et al. ................. | 174/37 X |
| 3,551,587 | 12/1970 | Propst ............................... | 174/37 X |

*Primary Examiner*—James D. Trammell
*Attorney*—Ronald E. Barry

[57] ABSTRACT

A self-contained circuit interrupter for an underground electric power distribution system, said interrupters being connected in series in the distribution line and including a shielded hermetically sealed housing, a pair of current interrupting contacts within the housing, an overcenter linkage system for biasing said contacts to a closed position, a solenoid actuated latch holding the linkage system in a position to close the contacts, a power circuit within the housing for tripping the solenoid for the latch and a sensor within the housing to activate the power circuit, the sensor being connected to respond to current and voltage in the cable and having a voltage to current inverse time current characteristic whereby the time required to activate the power circuit increases as the voltage increases for a given current in the cable, the housing having a non arc supporting atmosphere.

9 Claims, 4 Drawing Figures

PATENTED AUG 28 1973　　3,755,714

SELF-CONTAINED INTERRUPTING APPARATUS FOR AN ELECTRIC POWER DISTRIBUTION SYSTEM

RELATED APPLICATION

This application is a continuation in part of my co-pending application, now abandoned, Ser. No. 2,3734 filed Mar. 30, 1970 and entitled "Fault Locating and Isolating System for an Electric Power Distribution Circuit".

BACKGROUND OF THE INVENTION

In overhead power distribution systems, numerous types of circuit breakers or interrupters are available for interrupting current in a distribution line in response to temporary and permanent type fault conditions. Most of these interrupters are of the reclosing type which recycle to reclose the line to test for temporary type faults and after a predetermined number of cycles of operation open or close permanently. Generally, such interrupters require a separate power source and include additional components such as sensing relays and current transformers. The separate power source is required to actuate the tripping means.

SUMMARY OF THE INVENTION

The self-contained interrupting apparatus of the present invention provides for the automatic interruption of power in an underground power distribution line upon the occurrence of a permanent type fault in the line. Interruption occurs between the power source, and fault at a point adjacent to or in close proximity to the fault in the distribution line, thereby isolating the fault to the smallest short circuit section of the line and maintaining service to the customers on the remaining section of the line.

Each circuit interrupter is self-contained or totally encapsulate and includes all of the elements required to actuate the interrupter. The interrupter has a shielded housing in which are housed the interrupting contacts, a power circuit for tripping the mechanical holding elements for the contacts, and a sensing circuit which is responsive to a predetermined voltage-current characteristic in the distribution cable to activate the power circuit. The housing has a non-arc supporting atmosphere either by evacuating the housing or filling the housing with a gas or liquid.

Once the contacts are opened, the apparatus will not reclose and must be manually reset and closed in order to re-establish service in the repaired section of the distribution cable. The circuit interrupter of this invention is not influenced by momentary current surges or short time overloads due to the high operating potential of the interrupter and the time delay in the response characteristic of the sensor.

Other objects and advantages will become apparent from the following detailed description when read in connection with the accompanying drawing.

THE DRAWING

DESCRIPTION OF THE INVENTION

Figure 1:
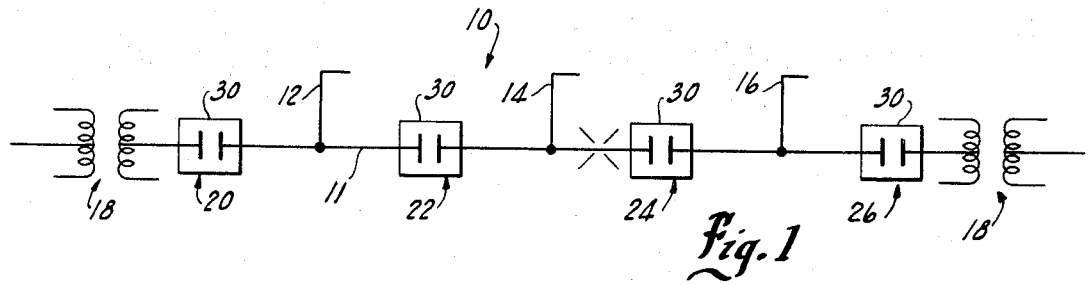
FIG. 1 is a schematic diagram of an underground distribution system having a circuit interrupting apparatus according to this invention positioned between each pair of tap distribution lines connected to the shielded cable for the power distribution system.

Referring to FIG. 1 of the drawing, the self-contained interrupter or apparatus of this invention is shown as used in an underground electrical distribution system 10 having a number of tap distribution or service lines 12, 14 and 16 connected at intervals along a shielded cable 11. In the drawing, an electrical power source 18 is shown generally at each end of the cable 11; however, the interrupter can be used in a distribution line having a power source at one end only. Circuit interrupting apparatus 20, 22, 24 and 26 are shown connected in series in the distribution cable 11 between each pair of tap distribution lines. In general, if a fault occurs at a point such as indicated by X in the cable 11, the circuit interrupting apparatus 22 and 24 which are located on each side of the fault X will open, isolating the section of the cable 11 between the two open apparatus 22 and 24. The remaining interrupting apparatus along the distribution cable 11 will remain closed thereby maintaining service along the cable 11.

If the distribution system is an open ended distribution system, with the power source 18 at the left end of the cable 11 only and a fault occurs at X only, the interrupting apparatus 20 and 22 are affected by the short circuit current. The apparatus 22 which is closest to the fault X will open interrupting service in the section of the cable 11 nearest the fault.

Figure 3:
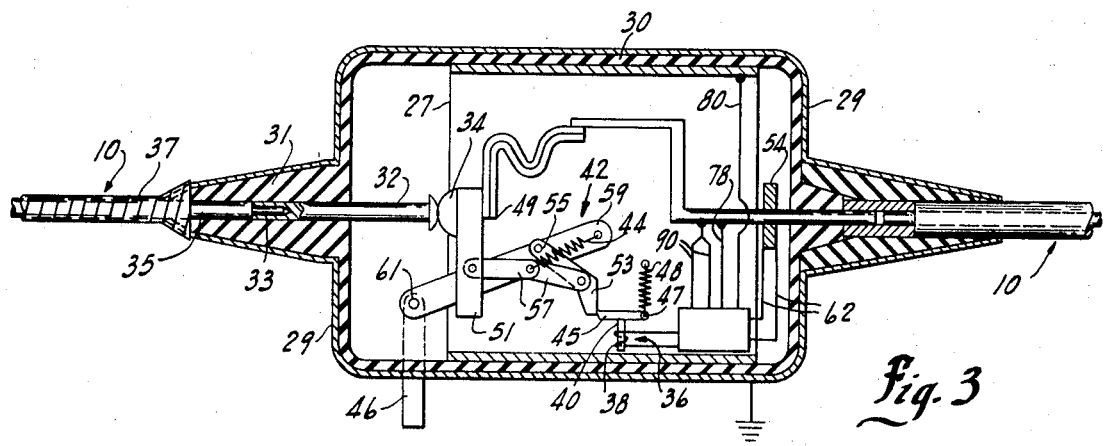
FIG. 3 is a side view in section generally showing the self-contained circuit interrupting apparatus of this invention connected at each end to the distribution cable.

In accordance with the invention, each of the apparatus 20, 22, 24 and 26 provide for the interruption of current in the distribution cable 11 when a fault or persistent overload condition occurs. The apparatus isolate the fault, thus maintaining service along the remainder of the distribution system and simplifying the location of the fault. The circuit interrupting apparatus 20, 22, 24 and 26, as shown in FIG. 3, each include a sealed housing 30 having a stationary contact 32 at one end a movable contact 34 mounted for movement relative to the fixed contact 32 within the housing 30. Both contacts 32 and 34 are connected to the cable 11 by means of bushings 31 provided at each end of the housing 30.

In this regard, the housing 30 is formed from an electrically non-conductive or dielectric material such as rubber or plastic and is shielded on the outside by means of a conductive coating or layer of electrically conductive material 29 and on the inside by means of an electrically conductive coating or cylinder 27. The ends of the shielded cable 11 are prepared for connection to the bushings 31 by stripping the cable insulation 35 from the end to expose the cable conductor 33. The electrically conductive sheath 37 is stripped from the insulation 35 and the end of the cable 11 is inserted into the bushing 31 for connection to the stationary contact 32 or movable contact 36. The electrically conductive shield 29 is grounded to the conductive shield 37 of the cable 11 by wrapping electrically conductive tape 39 around the end of the bushing 31.

The interrupting apparatus must be small enough to be conveniently buried or submerged with the underground system. In this regard, housing 30 is sealed and is provided with a non-arc supporting atmosphere. This can be achieved by either evacuating the housing 30 or filling the housing with a fluid or gas.

Means are provided within the housing 30 for biasing the contacts 32 and 34 to an open position to open the circuit through the housing 30. Such means is in the form of an overcenter mechanical linkage 42 connected to the contact 34. The contact 34 is moved to an open position by releasing the energy stored in a spring 44 connected to the linkage 42. The tension in the spring 44 is maintained by means of a latch or catch 45 which is operatively connected to the linkage 42. The contacts 32 and 34 remain in the closed position until a tripping situation is encountered. The latch is released by means of a solenoid 36 which is actuated to release the catch 45 and allow the spring 44 to open the contacts 32 and 34.

In this regard and referring to FIG. 3, the solenoid 36 includes a coil 38 and an armature 40 connected to the catch 45. The latch 45 is pivotally mounted on a fixed pin 47 and is biased by means of a spring 48 into engagement with the linkage 42. The linkage 42 includes a movable contact support arm 49 pivotally mounted on a fixed pivot pin 51, a bell crank 53 having one end pivotally mounted on a fixed pivot 55 and the other arm positioned to engage the catch 45, a pair of links 57 connecting the bell crank 53 to the contact arm 49, and an operating arm 59 rigidly connected to a pivot shaft 61. The links 57 are biased to the position shown in FIG. 3 by means of the spring 44. A fixed stop (not shown) is provided on the housing to limit the upward movement of the links 57.

The contacts 32 and 34 are manually opened by rotating operating arm 59 clockwise in FIG. 3 to change the direction of the force of the spring 44 which acts on the links 57. The change in the direction of the spring force will collapse the links 57 pulling the support arm 49 away from the contact 32. The operating arm 59 is rotated by means of a handle 46 which is rigidly connected to the pivot pin 61 externally of the housing 30. The contacts are opened automatically in response to a fault current, as more fully described below, by releasing the catch 45 from the bell crank 53. The force of the spring 44 will rotate the bell crank 53 about pivot 55 pulling the operating arm 49 away from the contact 32.

Figure 4:
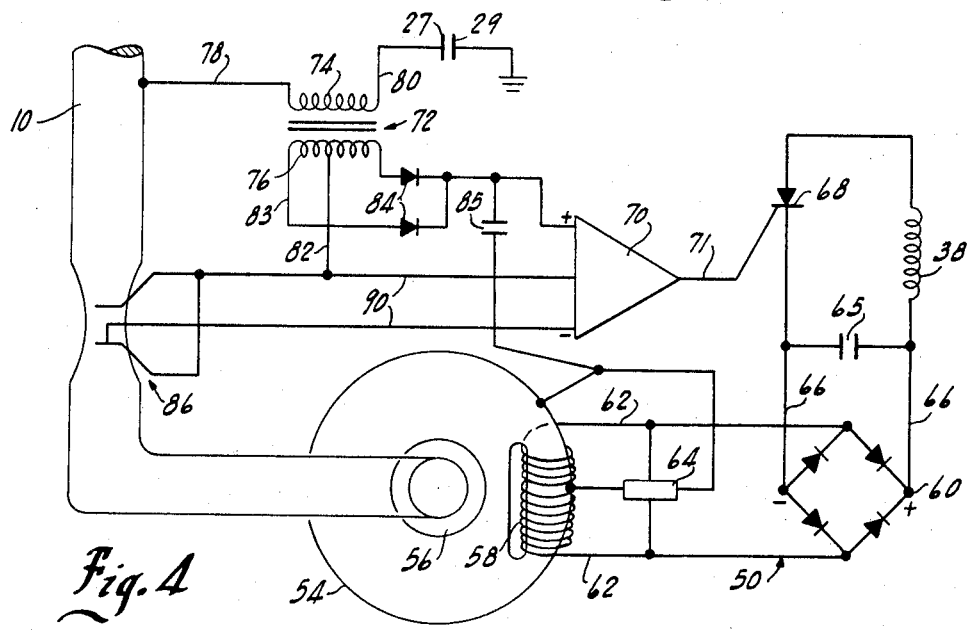
FIG. 4 is a circuit diagram of the control circuit for the circuit interrupting apparatus.

Means are provided for energizing the solenoid 36 to trip the linkage 42 and open the switch formed by the contacts 32 and 34 to interrupt the current in the line. Such means, as seen in FIG. 4, is in the form of a power circuit 50 for the solenoid coil 38 and a sensing or impedance circuit 52 to control or actuate the power circuit 50. The power circuit 50 includes means for providing electrical power to the solenoid coil 38 in the form of a conventional saturable core reactor 54 having a central aperture 56 through which the line 10 passes. A coil 58 is mounted on the core 54 and is connected to a bridge rectifier 60 by lines 62. A thyrister 64 is connected across line 62 to protect the circuit 50 by allowing excess current to flow out of the circuit as is generally understood. The solenoid coil 38 is connected across the bridge rectifier 60 by lines 66 and is controlled by means of a silicon controlled rectifier 68. A capacitor 65 is connected across the lines 66.

The silicon controlled rectifier 68 is triggered by means of the sensor impedance circuit 52 which includes a differential amplifier 70 connected to the rectifier 68 by a line 71. The differential amplifier 70 provides a signal to the rectifier 68 when the voltage and current in the line 10 exceeds a predetermined relation. In this last regard, the differential amplifier 70 is provided with a line voltage signal by means of a potential transformer 72 and a current signal by means of a thermocouple 86.

In the operation of the sensing circuit shown in FIG. 4, the thermocouple 86 senses the rise in temperature due to increases in current flow when overloads and short circuits occur. This gives a time current relationship like unto a fuse. For normal operating currents, this temperature rise would be nominal. As the temperature increases, the millivolt output of the thermocouple would also increase. The transformer 72 will provide an A.C. or D.C. potential, depending on the type of voltage sensor used, proportional to the line voltage. This potential is used to buck or counter the millivoltage output of the thermocouple 86 through the differential amplifier 70. The voltage signals from the thermocouple and the transformer can be adjusted to give a variety of tripping characteristics. (A capacitor or resistance divider may be substituted for the potential transformer.)

More particularly, and by way of example only the potential transformer 72 includes a primary coil 74 and a secondary coil 76. The primary coil 74 is connected to the line 10 by a line 78 and grounded to the housing 30 by a line 80 connected to inner shield 27. In this regard, the insulation provided by the housing 30 provides either a coupling capacitor or resistance to ground. The secondary coil 76 is connected across the differential amplifier 70 by line 82 and line 83 which includes diodes 84. A capacitor 85 is connected between line 83 and line 90. The transformer 72 provides a signal in relation to the voltage on the line 10.

The current signal to the amplifier 70 is provided by means of the thermocouple 86 through lines 90, which responds to the rise in temperature on the line 10 due to increase in current flow when overloads and short circuits occur. Although a thermocouple is shown, other current sensing elements can be used to provide the current signal such as a current transformer or shunt.

Under normal operating conditions, the voltage signal will be higher than the current signal and the amplifier will be positively biased and non-conductive. When the voltage drops due to a fault, as indicated at X in FIG. 1, the voltage on either side adjacent to the fault will drop. As the temperature in the line circuit increases, due to the fault current, the thermoucouple potential signal will increase, providing a negative bias to the amplifier 70. When this signal exceeds the bias of the voltage signal, the amplifier will transmit a signal to trigger the SCR and energize the solenoid coil circuit. The mass and section of the conductor 10 adjacent to the thermocouple 86 introduces an inverse time current characteristic into the operation of the circuit, like unto the time current characteristic of a fuse.

Figure 2:
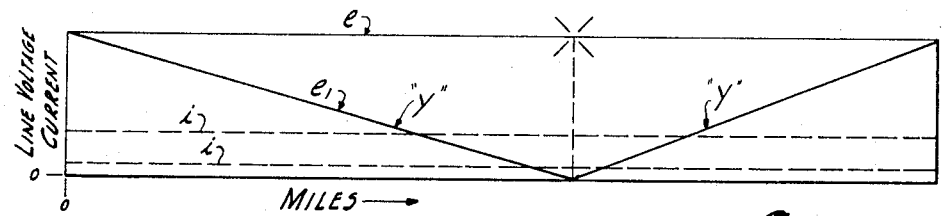
FIG. 2 is a diagrammatic showing of the normal line voltage e to distance in miles of the distribution cable shown in FIG. 1 and the line voltage $e_1$ when a fault occurs in the line.

The operation of the differential amplifier 70 will be better understood by referring to FIG. 2 where a characteristic curve is shown for the normal current $i$ and voltage $e$ across distribution line 10 and the curve $e_1$ for the voltage when a fault occurs at point X in the distribution line. As long as normal current and voltage are present in the line, the signal from the thermocouple will not exceed the signal from the potential transformer. When a fault X occurs in the line, the voltage drops to zero at the fault in a substantially linear relation from the power source to the fault due to the impedance of the line. The fault current on the line will increase the temperature of the line conductor 10 which is sensed by the thermocouple 86 to provide a millivoltage to the differential amplifier 70. When this millivoltage is sufficient to bias the amplifier 70 to a predetermined level, the amplifier 70 will provide a signal to the SCR 68 to trigger the solenoid coil circuit.

If there is a power source 18 only on the left end of the line 10, only the one circuit breaker 22 which is nearest the fault X will open. The lineman will still be able to locate the fault quickly, since the fault must lie to the right of circuit breaker 22. If the fault occurred between circuit breakers 24 and 26, circuit breaker 24 would have opened instead of circuit breaker 22.

RESUME

The present invention combines all of the required functions for circuit interruption within a completely self-contained apparatus or device. No supporting equipment, such as a potential transformer, current transformer, sensing relay tor separate power source for tripping the interrupter. All of these functions are performed by the apparatus of this invention. Since all of the functions have been combined in this device, it is readily adaptable for use in an underground envoronment. Manual open, close and reset can be performed exteriorly of this interrupter.

I claim:

1. A self-contained circuit interrupting apparatus for isolating faults in an underground cable for a distribution line, said apparatus comprising,
   a housing,
   an electrically conductive surface on said housing,
   means for grounding said surface,
   first and second electrical contacts within said housing connected to the cable conductor,
   means for holding said contacts in a closed position,
   and means within said housing for tripping said holding means to open said contacts,
   said tripping means including a current-voltage sensing circuit electrically coupled to the cable conductor to provide a signal for actuating said tripping means, said sensing circuit having an inverse time current trip characteristic which is responsive to a change in the potential in said conductor.

2. The apparatus according to claim 1 wherein said current voltage sensing circuit includes,
   an electric power source within said housing electrically connected to said cable conductor for powering said tripping means,
   a current sensing element electrically connected to said conductor and a voltage sensing element electrically coupled to said conductor, 3. The apparatus according to claim 2 wherein said current sensing element comprises a thermocouple connected to respond to the temperature of the cable conductor within said housing.

4. The apparatus according to claim 1 wherein said housing is sealed,
   and a non-arc supporting atmosphere within said housing.

5. The apparatus according to claim 2 wherein said circuit includes a differential amplifier connected to said power source,
   said current sensing element and said voltage sensing element being connected to said amplifier whereby said amplifier will provide a control signal to said power source when said current signal exceeds said voltage signal.

6. In an underground power distribution system including a shielded cable, said cable including,
   a cable conductor,
   a cable insulation and
   a semi-conductive shield,
   a plurality of self-contained circuit interrupters interposed in said cable to automatically isolate a faulted section of said cable from the power source,
   each of said interrupters including,
   a housing,
   a conductive member within said housing connected to said cable conductor,
   a pair of contacts interposed in said conductive member,
   means for holding said contacts in a closed position,
   means for automatically tripping said holding means,
   said tripping means including,
   a power circuit electrically connected to said conductive member, and
   a sensing circuit electrically coupled to said conductive member and to said power source to control said tripping means,
   said sensing circuit having an inverse time current trip characteristic which is responsive to a change in the potential in said cable conductor whereby said interrupting assembly closest to a fault in the cable will respond to the fault first.

7. The system according to claim 6 wherein said sensing circuit includes,
   a current sensing element and,
   a voltage sensing element.

8. The distribution system according to claim 6 including,
   an electrically conductive surface on said housing and
   means for connecting the conductive surface to ground.

9. The distribution system according to claim 6 wherein said housing is hermetically sealed and contains,
   a non-arc supporting atmosphere.

* * * * *